Oct. 7, 1958  J. C. SETECKA  2,854,849
MEASURING SCOOP
Filed Nov. 25, 1955
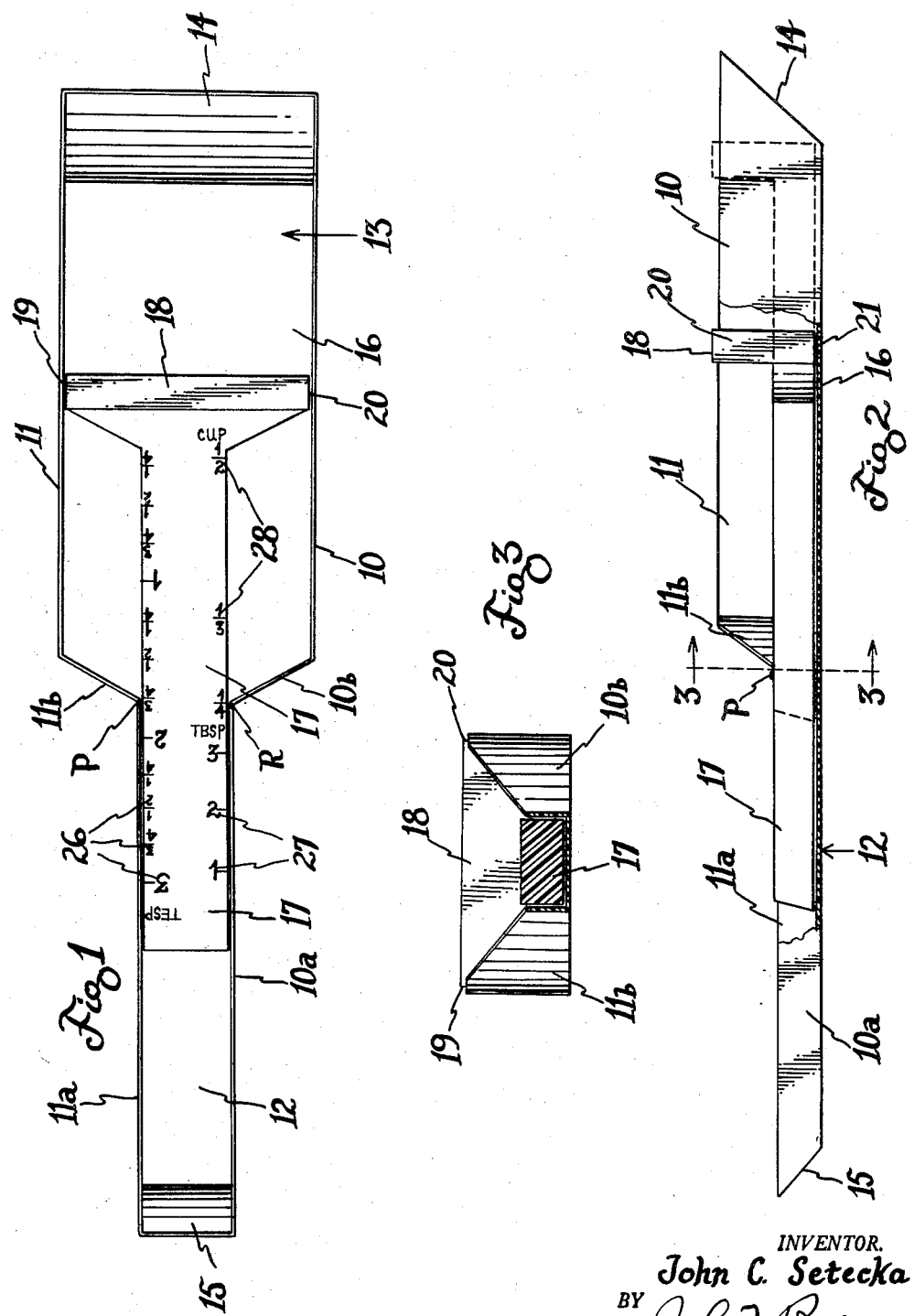
INVENTOR.
John C. Setecka
BY John F. Brezina
Att'y

United States Patent Office 2,854,849
Patented Oct. 7, 1958

2,854,849
MEASURING SCOOP

John C. Setecka, Chicago, Ill.

Application November 25, 1955, Serial No. 548,966

6 Claims. (Cl. 73—429)

This invention is directed to adjustable measuring devices and particularly to those types of measuring devices adaptable for use in measuring varying quantities of liquid, powder like, comminuted or other pourable materials.

Previous known devices used principally by housewives have usually a plurality of separate spoons of varying size, which have normally been loosely connected together for separate selective use. Other present devices for measuring varying amounts of material have included rather complex structures and mechanism and in most instances these have not been adaptable for both liquids and other non-liquid materials and have been relatively difficult to clean.

It is an important object and accomplishment of my invention to provide a relatively light, portable and easily cleanable measuring device which is capable of measuring a relatively wide range of materials, and which embodies an elongated receptacle having a relatively large compartment or chamber and having a relatively narrow elongated compartment so that a very wide range of quantities may be accurately and quickly measured.

It is a further important object and accomplishment of my invention to provide a single, relatively inexpensive device for measuring a wide range of quantities of materials, and which includes a relatively larger compartment and an integral relatively small compartment, and in which a manually movable stopper is slidable, said stopper having an enlarged baffle member which is slidable in the enlarged compartment to vary selectively the capacity of the enlarged compartment, and wherein said slidable stopper carries indicia to indicate the quantity capacities of the respective compartments of said device.

Other and further objects of my invention will be apparent from the following description and appended claims.

On the drawings:

Fig. 1 is a top plan view of my novel measuring device.

Fig. 2 is a side elevation thereof with the intermediate portions of one wall thereof broken away.

Fig. 3 is a cross sectional view taken on a transverse plane indicated by the line 3—3 of Fig. 2.

Referring to the illustration of my invention shown in the drawings, my adjustable measuring device comprises an elongated upwardly opening trough-shaped receptacle or container having a substantial flat bottom 16 and upwardly extending connected side walls 10, 10a and 11 and 11a, which said walls are preferably formed integral with said bottom 16. The said side walls are each angularly offset by integral intermediate inwardly extending connecting wall portions 10b and 11b and which merge into and connect the wall portions 11 and 11a and wall portions 10 and 10a respectively. The two substantially parallel side wall portions 10a and 11a are substantially closer together and define an elongated smaller compartment or receptacle generally indicated by numeral 12. It will be noted that the walls 10 and 11 are substantially farther apart than the walls 10a and 11a and accordingly define a larger container or receptacle 13 of substantially greater capacity and content.

As illustrated in Fig. 2, the side walls 10a and 11a are of substantially less height than side walls 10 and 11 so that the smaller receptacle 12 is of less depth.

Numeral 14 designates an outwardly inclined end wall which is preferably integral with and connects the end portions of the side walls 10 and 11. Numeral 15 designates an outwardly and upwardly inclined end wall which is preferably integral with and connects the two side wall portions 10a and 11a. The aforesaid side walls are preferably perpendicular to the bottom 16 so that a movable object of rectangular cross section may fit snugly between said opposite walls respectively.

Numeral 17 generally designates an elongated stopper or stopper member of rectangular cross section and preferably made of suitable plastic. The transverse dimension of the stopper member 17 is such that it fits snugly within the compartment or receptacle 12, though being slidable therein and being of a sufficiently tight fit to prevent either liquid or dry materials from entering between the lateral faces of said stopper member and the walls 10a and 11a of the smaller receptacle 12.

Said stopper member 17 carries and preferably has formed integral therewith an enlarged head which forms a transversely extending block or baffle 18 whose main portion is of substantially rectangular shape and partially defined by opposite end faces 19 and 20, and a bottom flat face 21, which flat face 21 normally rests upon or slides upon the flat bottom 16. The height of the baffle 18 is substantially equal or slightly greater than the depth of the larger rectangular container 13.

Numeral 26 designates a plurality of spaced apart indicia impressed or otherwise reproduced along one edge of the upper face of the stopper member 17, said indicia preferably indicating a number of teaspoons and fractions thereof and which would represent the capacity of that portion of the smaller compartment or receptacle 12 which is beyond the end of stopper member 17. Said indicia would be so positioned that any one of said indicia may be selectively positioned, by sliding movement of said stopper member, in alignment with a point marked "P" substantially at the juncture of the side wall 11a and connecting wall section 11b. It will be understood that the size and dimensions of the smaller receptacle or container 12 would be predetermined and made to correspond to a certain number of measurement units, in this instance such measuring units being teaspoons.

The opposite end of said stopper member 17 carries or has suitably reproduced thereon a plurality of indicia 27 which indicate known measurement units, which in the illustration shown are designated as 1, 2 and 3 in spaced apart positions along the edge nearest the smaller end of said stopper member 17. Such indicia 27, which preferably designate quantities equal to tablespoons, are adapted to be selectively positioned adjacent to a marked point designated as "R" borne by the side wall 10a. It will be understood that the dimensions and capacity of the larger chamber or container generally designated as 13 would be predetermined and made to conform to a fraction or multiple of such units of quantity, for example, tablespoons, it being understood that when said stopper member and baffle 18 is positioned to indicate a given quantity of measurement units represented by said indicia 27, the volume or capacity of the space or chamber between the wall 14 and baffle 18 would be of equal volume and capacity.

A third set of indicia indicating known units of measurement, preferably a "cup" or fractions or multiples thereof, and designated as numeral 28, are suitably reproduced upon the edge portion of the upper face of the stopper member 17. Said indicia 28 designate the more retracted positions of the baffle 18 and stopper member 17, and such indicia would be equal to and designate the volume and capacity of the space between inclined end wall 14 and baffle 18 and between portions of side walls 10 and 11.

I desire to point out that an important and novel advantage of the described construction having the upwardly inclined end wall 14 is to permit quantity or volume measurement of a smaller amount than would be permissible with a container or receptacle having a perpendicular end wall, and in addition such inclined end wall provides for easier scooping up and discharge of the measured material. A similar novel advantage is obtained in connection with the measuring of relatively small quantities of material in the end portion of the reduced and small container or compartment 12, as positioning of the stopper member 17 with its flat end acting as the stopping means near the said inclined wall 15 provides a receptacle and compartment of relatively small capacity which may be in fractions of teaspoons, as indicated by the corresponding indicia 27.

It will be understood that when a person uses the reduced end and smaller receptacle for portion 12 for measuring and scooping any particular material, the user will grip the enlarged and wider portion of the device to hold the same during the scooping and measuring operation; and further, that when the user desires to accelerate the discharge of the material from the said smaller receptacle portion 12, the user will grip the baffle member 18, using it as a handle means while moving the reduced slide 17 between and in slidable engagement with the side walls 10a and 11a and in engagement with the connecting bottom.

It will be further understood that when the larger scoop portion or compartment 13 is utilized, the smaller or reduced end of the device provides a convenient gripping and holding means, and that the user will with his other hand grip the stopper member 17 to permit selective positioning of block or baffle 18 and to permit selective manual movement of said stopper member to accelerate the discharge of the contents.

It will be understood that my adjustable measuring device comprises the novel combination of elements substantially as described which cooperate in a novel manner to provide a novel and efficient measuring device which is easily adjusted to measure the desired quantity of either liquid or solid material. A further advantage of said construction is that it may be easily and completely emptied of the material, whether same be of dry or sticky form, by manual movement of the slidable stopper against the previously measured material and along either the inclined end wall 14 or along the smaller inclined end wall 15.

As many changes could be made in the above construction, and as many apparently widely different embodiments of my invention within the scope of the claims could be constructed without departing from the matter contained in the accompanying specification shall be interpreted as illustrative and not in a limiting sense.

I claim:

1. An adjustable measuring device for pourable materials comprising a relatively wide receptacle of U-shaped cross section and having upwardly extending side walls perpendicular to a flat bottom, and having an inclined end wall, said receptacle being adapted to receive pourable materials; and having a substantially reduced troughlike elongated container contiguous with said wide receptacle and having parallel opposite side walls merging into and integral with the side walls of said wider receptacle, said container being adapted to receive measurable material; an elongated stopper member of substantially rectangular cross section slidably mounted in said reduced container, said stop member providing a pair of inner walls closing and defining connectable measuring compartments in said container and said receptacle; measuring indicia on said stopper; said inner walls slidably seating in said container and said receptacle, and being adapted to vary the capacity of said container and said receptacle.

2. A measuring device as described in claim 1 wherein said reduced elongated container has an outwardly and rearwardly inclined integral wall to provide for measurement therein of relatively small quantities of material, said reduced container providing a channel therein communicatively connected with said wide receptacle, said stop member being normally manually removable from said reduced container whereby material measured in said reduced container may be poured therefrom into said wide receptacle.

3. An adjustable measuring device for domestic use comprising an upwardly opening trough-like receptacle, said receptacle having an elongated relatively narrow compartment terminating in an upwardly inclined wall, said narrow compartment having an enlarged unobstructed material receiving orifice and being adapted to receive measurable material therein, a relatively larger compartment defined by a flat bottom, upwardly extending side walls and an upwardly inclined end wall, said larger compartment being communicatively connected to said narrow compartment; an elongated frictionally retained and manually normally removable stopper member having one portion thereof of a solid cross section corresponding to the cross section of said smaller compartment and slidable in said compartment; and an enlarged baffle on the inner end of said stopper member and of a cross sectional shape corresponding to the shape of said larger compartment, said baffle and end member portion being slidable in said respective compartments and being adapted to selectively vary the capacity of the spaces between the ends of said retainer and the inclined end walls; and a plurality of spaced apart indicia on the upper face of said stopper member, a part of said indicia being adapted to indicate the units of capacity of said smaller compartment, and other of said indicia being adapted to indicate the units of capacity of the space of said larger compartment.

4. An adjustable measuring device for pourable materials comprising an elongated trough-shaped container having one end portion thereof substantially wider than the opposite end portion thereof; said wider portion of said container terminating in an outwardly inclined end wall; said narrower portion of said container terminating in a rearwardly inclined end wall; said container having a pair of opposed communicable chambers of variable capacity an elongated stopper slidably and normally removably mounted in the narrower portion of said container; and a stop face on each end face of said stopper, each face extending from and normally slidably engaging the opposite side walls of and providing an adjustable limit for the capacity of its respective chamber, and measuring unit indicia on the upper face of said stopper.

5. An adjustable measuring device as described in claim 3 and in which the said larger receptacle and compartment is partially defined by side walls and inclined end wall of greater height than the side walls and end wall of said smaller compartment.

6. An adjustable measuring device for pourable materials comprising a container having a larger and a smaller receptacle communicatively connected and partially defined by parallel angularly offset side walls and each terminating in an inclined end wall; a normally removable elongated stopper member of cross section substantially conforming to the cross section of said smaller receptacle; limiting faces at opposite ends of said stopper member and providing means for wholly separating said receptacles, said faces being slidable in said receptables and defining the limits of capacity thereof; and measuring indicia on said stopper adapted to indicate the capacities of both said receptacles.

References Cited in the file of this patent

UNITED STATES PATENTS

| | | |
|---|---|---|
| 2,165,642 | Mayer | July 11, 1939 |
| 2,626,526 | Chester | Jan. 27, 1953 |
| 2,747,410 | Dubin | May 29, 1956 |